United States Patent [19]

Roos

[11] Patent Number: 5,059,967
[45] Date of Patent: Oct. 22, 1991

[54] APPARATUS AND METHOD FOR DISPLAYING WEATHER INFORMATION

[76] Inventor: Mark G. Roos, 11926 W. 49th Ter., Shawnee, Kans. 66216

[21] Appl. No.: 499,848

[22] Filed: Mar. 27, 1990

[51] Int. Cl.$^5$ .................. G01S 13/64; G01S 7/22; G01S 7/24
[52] U.S. Cl. ........................... 342/26; 342/176
[58] Field of Search ............ 342/26, 176, 179, 460

[56] References Cited

U.S. PATENT DOCUMENTS

| | | | |
|---|---|---|---|
| 2,822,536 | 2/1958 | Sandretto | 342/26 |
| 3,359,557 | 12/1967 | Fow et al. | 342/26 X |
| 3,646,555 | 2/1972 | Atlas | 342/26 |
| 3,781,878 | 12/1973 | Kirkpatrick | 342/26 |
| 4,043,194 | 8/1977 | Tanner | 342/26 X |
| 4,128,834 | 12/1978 | Katagi | 342/183 |
| 4,249,174 | 2/1981 | Lucchi et al. | 342/26 |
| 4,346,595 | 8/1982 | Gary | 342/26 X |
| 4,435,707 | 3/1984 | Clark | 342/26 |
| 4,761,650 | 8/1988 | Masuda et al. | 342/26 |
| 4,940,987 | 7/1990 | Frederick | 342/26 |

*Primary Examiner*—John B. Sotomayor
*Attorney, Agent, or Firm*—Howard G. Massung; Robert A. Walsh

[57] ABSTRACT

A weather display apparatus and method wherein the relative positions of weather information and reference marks are accurately displayed. Information obtained from typical airborne weather radars is distorted due to the use of imperfect beams, such as a conical beam. The distorted weather information is displayed to a pilot. At least one reference mark is also displayed on the display in positions in accordance with relative positions in the airspace and with a distortion factor.

6 Claims, 1 Drawing Sheet

APPARATUS AND METHOD FOR DISPLAYING WEATHER INFORMATION

BACKGROUND OF THE INVENTION

The present invention relates to apparatus and method for displaying weather information. More specifically, it relates to apparatus and method for displaying weather information obtained from an airborne weather radar.

Aircraft equipped with weather radars are able to collect information concerning weather conditions in the airspace in front of the aircraft. The weather radars generally include at least a transmitter, a receiver, an antenna and a display. The weather radar examines a weather cell, which comprises a limited area of space in front of the aircraft, by transmitting energy from the transmitter through the antenna along the line in which the antenna is pointing. The position of the antenna is incrementally stepped so that energy is transmitted throughout the weather cell during a scan. If a weather disturbance, such as a rain storm, is in the weather cell then a portion of the transmitted energy will be reflected. The reflected energy is collected by the antenna and fed to the receiver. The weather information is derived from the reflected energy and then displayed to a pilot to aid in the navigation of the aircraft.

The antenna usually fits into the front cone of the aircraft and, therefore, is limited to the size of the cone. In smaller commuter type aircraft, for example, antennas having diameters of 8 inches, 10 inches or 12 inches are common. Antennas of this size, however, transmit a beam that widens as the beam travels away from the aircraft. These beams, if visible, typically would look conical. As a result, energy is reflected when the fringe areas of the conical transmitted beams first encounter a weather disturbance as well as when they leave the weather disturbance. Since the weather radar thinks the antenna is pointing along the center of the conical beam and, therefore, does not expect returns resulting from the fringe areas of the transmitted beam, the resulting weather information is distorted. The distorted weather information is then displayed to a pilot, a less than desirable situation.

SUMMARY OF THE INVENTION

The present invention provides apparatus and method for displaying weather information which is obtained from a weather radar that transmits a beam that widens as it travels through airspace. Initially, a weather cell is scanned to obtain weather information. The weather information, however, is distorted due to the wide beam. The distorted weather information is displayed on a display in accordance with the position in the weather cell from which the weather information was obtained. In a preferred embodiment, two reference marks are displayed in positions on the display in accordance with related positions in the airspace and with a distortion factor so as to keep the scaled relative distances between the displayed items accurate. The distortion factor is related to the width of the transmitted beam.

It is an object of the present invention to provide a method and apparatus for accurately displaying the relative positions of one or more reference marks and the weather information on the display.

It is a another object of the present invention to provide weather display apparatus and method wherein unnecessary aircraft maneuvers are avoided.

In a further preferred embodiment, the weather radar is vertically scanning the weather cell. The two reference marks displayed are altitude lines.

DESCRIPTION OF THE PREFERRED EMBODIMENT

Figure 1:
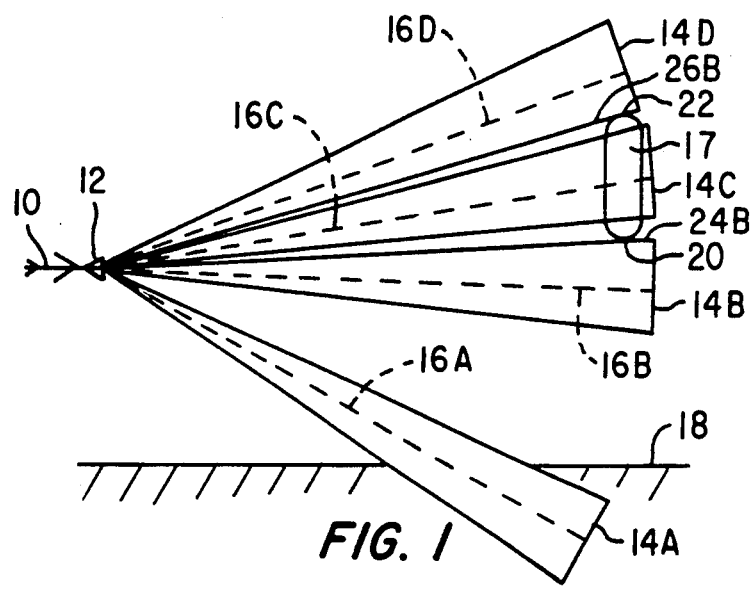
FIG. 1 illustrates an aircraft having an onboard weather radar which transmits conical beams to receive weather information.

FIG. 1 illustrates an aircraft 10 which is equipped with a radar 12. The position of the antenna 12 is being incrementally stepped in the vertical direction so as to effect a vertical scan of a weather cell in front of the aircraft 10. Of the many beams transmitted towards a weather cell in the front of the aircraft, four beams 14A, 14B, 14C and 14D are illustrated. Each of the beams 14A, 14B, 14C and 14D widen as their range from the aircraft 10 increases. In FIG. 1, for example, the beams 14A, 14B, 14C and 14D are conical in shape and, therefore, have a diameter that is increasing. This is due to the size of the antenna 12. This limitation is inherent in most airborne weather radars due to the limited space available for the antenna 12.

In FIG. 1, the beam 14A is the first beam transmitted. The antenna 12 is pointed along the line 16A which runs through the center of the conical beam 14A. At a range of 10 nautical miles (NM) from the aircraft, therefore, the beam 14A is pointing at an altitude which is below ground 18. Sometime later, after the antenna 12 has been pointed to a higher altitude, the beam 14B is transmitted while the antenna 12 is pointing along the line 16B such that at 10 NM the beam 14B points at approximately 20,000 feet, the altitude of the aircraft 10. As the antenna 12 continues to move upwards, the beams 14C is transmitted while the antenna 12 is pointing along the line 16C such that at 10 NM the beam 14C points at approximately 30,000 feet. Then the beam 14D is transmitted while the antenna 12 is pointing along the line 16D such that at 10 NM the beam 14D points at approximately 54,250 feet.

In the weather cell being scanned by the beams 14A, 14B, 14C and 14D, a weather disturbance 17 is present. The weather disturbance 17 has a lower boundary 20 which is located at an altitude of approximately 24,250 feet. The weather disturbance 17 has an upper boundary 22 which is located at an altitude of approximately 54,250 feet.

As a result of the geometry of FIG. 1, the antenna 12 will receive ground returns as the ground 18 reflects the beam 14A. As the antenna 12 is incrementally stepped from the position in which the beam 14A is transmitted to the position from which the beam 14B is transmitted, little or no return signals from weather disturbances are received at the antenna 12 since there are no weather disturbances in this region, thereby indicating clear weather.

Once the beam 14B is transmitted, however, the antenna 12 begins to receive return signals from the weather disturbance 17. This is true even though the weather radar associated with the antenna 12 believes the antenna 12 is pointing along the line 16B at an altitude of approximately 20,000 feet while the lower boundary 20 of weather disturbance does not start until an altitude of approximately 24,250 feet.

The unexpected return signals from the weather disturbance 17 are due to the width of the beam 14B. If the antenna 12 is approximately 12 inches in diameter, then the conical beam 14B will be approximately 8° in width. Due to this width, a leading edge 24B of the beam 14B will extend approximately 4,250 feet above the line 16B at 10 NM. Since the lower boundary 20 of the weather disturbance 17 also exists at approximately 24,250 feet, a portion of the beam 14B along the fringe will be reflected by the weather disturbance 17. This causes the weather radar in the aircraft 10 to interpret the weather information received to mean that a weather disturbance exists at 20,000 feet.

Note that since the aircraft 10 is flying at an altitude of 20,000 feet and since a weather disturbance 16 has been determined to exist at 20,000 feet, a pilot flying the aircraft may make navigation decisions based on incorrect information. For example, the pilot may decide to lower the altitude of the aircraft 10 unnecessarily.

As the beam is moved further upwards, the entire width of the beam intersects the weather disturbance 17, for example, as seen in the beam 14C. As the beam is moved further upwards the weather information is further distorted as the beam exits the weather disturbance 17. For example, consider the beam 14D which is pointing along the line 16D at an approximate altitude of 54,250 feet. The trailing edge 26D of the beam 14D, therefore, points at an altitude of approximately 50,000 feet. Since the upper boundary 22 of the weather disturbance 17 is also at approximately 50,000 feet, a portion of the beam 14D on the fringe of the cone will be transmitted back to the antenna 12. The weather radar in the aircraft 10 will therefore, incorrectly display the upper boundary 22 of the weather disturbance 17 at approximately 54,250 feet. The weather information derived by the weather radar in the aircraft 10, therefore, is distorted due to the wide beams 14A, 14B, 14C and 14D. This distortion is called beam smearing. Note also that the display of the returns from the ground 18 will also be smeared.

Figure 2:
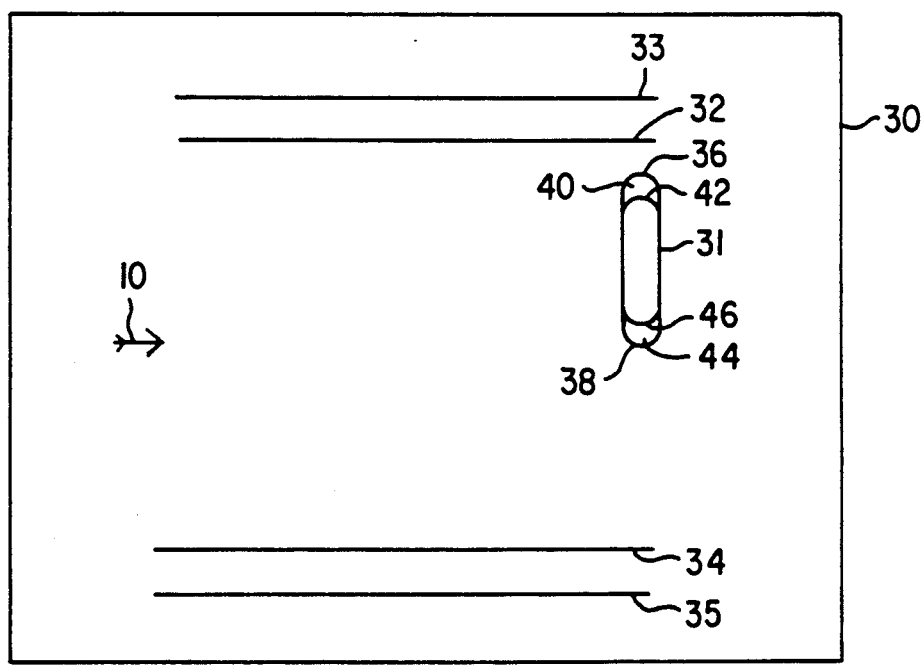
FIG. 2 illustrates a preferred display in accordance with the present invention.

Referring to FIG. 2, a display 30 of the weather information derived from the scenario of FIG. 1 is illustrated. The weather disturbance 31 is illustrated on the display along with a first altitude line 32 and a second altitude line 34. The first altitude line 32 represents a relative altitude above the aircraft 10 and the second altitude line 34 represents a relative altitude below the aircraft 34. It is preferred to numerically display the associated relative altitude in thousands to the right of each altitude line.

The display 30 illustrates a scaled down version of the actual weather conditions. As the range of the weather radar is changed, the scale of the display 30 is also changed. The relative altitudes respresented by the first 32 and second 34 altitude lines then must also change. For example, it is preferred to display altitude lines having relative altitudes of 30,000 feet above and below the aircraft 10 when a range of 20 NM is selected, while it is preferred to display altitude lines having relative altitudes of 60,000 feet above and below the aircraft 10 when a range of 40 NM is selected.

If the weather information obtained from the beams 14A, 14B, 14C and 14D is displayed, however, the scaled distance between the weather information and the altitude lines 32 and 34 will not accurately reflect the actual conditions as seen in FIG. 1. This is due to the distortion of the weather information, as previously explained.

For example, the weather disturbance 31 is displayed having an upper boundary 36 and a lower boundary 38. Note that the shape of the displayed weather disturbance 31 is different than the shape of the actual weather disturbance 17. The upper portion 40 of the displayed weather disturbance 31 is due to the beam smearing problem as the transmitted conical beam 14D is leaving the weather disturbance 17 during an upward vertical scan. The upper portion 40 also results when a transmitted beam first encounters the weather disturbance 17 during a downward vertical scan. If the displayed weather disturbance 31 were completely accurate, then the upper boundary would be displayed at 42. The scaled distance between the upper boundary 36 of the displayed weather disturbance 31 and the upper altitude line 32, therefore, will not accurately reflect existing conditions. In accordance with the present invention, it is preferred to adjust the line 32 upwards on the display 30 to a now line position 33 so as to more accurately reflect the scaled distances. Only the line 33 is displayed.

The situation is similar for the area of the display 30 below the aircraft 10. The lower portion 44 of the displayed weather disturbance 31 is due to the beam smearing problem as the transmitted conical beam 14A is encountering the weather disturbance 17 during an upward vertical scan. The lower portion 44 also results when a transmitted beam leaves the weather disturbance 17 during a downward vertical scan. If the displayed weather disturbance 31 were completely accurate, then the lower boundary would be displayed at 46. The scaled distance between the lower boundary 38 of the displayed weather disturbance 31 and the lower altitude line 34, therefore, will not accurately reflect existing conditions. In accordance with the present invention, it is preferred to adjust the line 34 downwards on the display 30 to a line 35 so as to more accurately reflect the scaled distances. Again only the line 35 is displayed.

The amount by which the lines 32 and 34 are adjusted is dependent on the width of the transmitted beam. For example, if the beam has a width of 8° and if the beam is pointing straight ahead of the aircraft 10, then the fringe areas of the beam, at a given distance, will perpendicularly extend approximately 6.9% (tan 4°) of the distance away from a line through the center of the beam. In other positions of the beam, either up or down, the actual distance is not calculated as easily because a right angle is not involved, however, the 6.9% is a good approximation. The positions of the lines 32 and 34, therefore, can be adjusted accordingly by 6.9% for each range so that accuracy of the scaled distances indicated on the display 30 is improved.

Any number up to 6.9% can be used as a distortion factor to adjust the placement of the altitude lines 32 and 34. For example, the returns from the fringe areas of the beam will be weaker than returns obtained when the beam is pointing completely into the weather disturbance 17. This will be reflected by the different coloration of the areas 40 and 44. In some cases, it may be desired to only correct the distortion of relative distances for the weakest returns, thereby increasing the margin of safety for the pilot. In these cases, a smaller distortion factor can be used.

The percentage used as a distortion factor is constant for all ranges of the radar. As the range of the radar is adjusted, the scale of the display 30 is adjusted accordingly. Since the distortion factor is a percentage, the altitude lines 32 and 24 can be displayed in the same positions on the display 30 and still maintain the relative accuracy of the display 30. This makes the implementation of the distortion factor very easy as it becomes a constant that is utilized.

In another preferred embodiment, the lines 32 and 34 are be displayed instead of the adjusted lines 33 and 35, however, the numerical display of teh altitude associated with those lines is adjusted in accorance with the distortion factor, so that the relative distances are accurately reflected. In this preferred embodiment, the lines 32 and 34 are displayed at all times and the numerical display of the altitude associated with each of the lines 32 and 34 is changed in accordance with the distortion factor to accurately display the relative distances. In the case of the upper line 32, the numerical display of the altitude is reduced by the distortion factor (again dependent on the beam width). In the case of the lower line 34, the numerical display of the altitude is increased by the distortion factor.

This display is applicable to all types of weather radar which transmit a beam that widens as it travels. See, for example, the RDS 82/84/86 series of weather radars manufactured and sold by Bendix/King. As another example, see the patent application Allied File No. 462-89-001, filed Mar. 20, 1990, which is hereby incorporated by reference.

Although the display is illustrated in a radar which is vertically scanning, it is also applicable to radars which horizontally scan since the weather information is smeared due to the beam width and not due to the direction of scan. Furthermore, any type of reference marks can be adjusted by the distortion factor.

Figure 3:
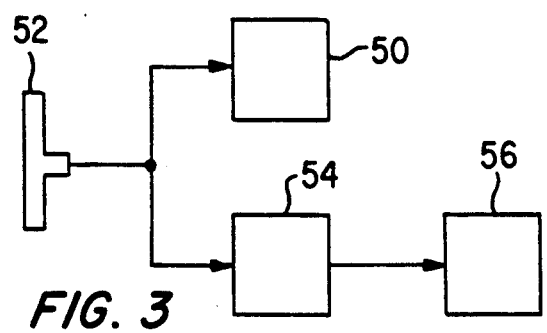
FIG. 3 is a block diagram of an airborne weather radar in accordance with the present invention.

FIG. 3 illustrates a basic block diagram of a radar system. A transmitter 50 develops the signal that is transmitted by the antenna 52 to the airspace. The antenna 52 receives any reflected signals and sends them to the receiver 54 for eventual display on the display 56. Since the reference lines 32 and 34 are generally displayed in the same position and since that positioned is adjusted by a constant distortion factor, the display 56 can implement the distortion factor by simply adding the distortion factor when displaying the reference lines.

I claim:

1. A method for displaying information relating to a weather disturbance, and which information is obtained from weather radar equipment mounted on an aircraft, said weather radar equipment transmitting a beam that widens as it travels through space, comprising:
    scanning a weather cell with said transmitted beam to obtain information relating to the position of the weather disturbance in space;
    displaying the obtained information in the form of a display showing the position of the weather disturbance relative to reference marks positioned on the display, the position of the reference marks being related to the position of the aircraft and being distorted due to the widening of the transmitted beam;
    developing a distortion factor based upon the beam being positioned straight ahead of the aircraft, whereupon the beam width extremities at a given range of the radar equipment extend substantially normal to the beam centerline;
    using the developed distortion factor as an approximation for other positions of the beam relative to the aircraft for each range of the radar equipment, whereupon the developed distortion factor is a constant for all ranges; and
    adjusting the position of the reference marks on the display to compensate for said distortion.

2. A method as described by claim 1, wherein:
    developing a distortion factor based upon the beam being positioned straight ahead of the aircraft, whereupon the beam width extremities at a given range of the radar equipment extend normal to the beam centerline develops a maximum distortion factor.

3. A method for displaying information relating to a weather disturbance, and which information is obtained from weather radar equipment mounted on an aircraft, said weather radar equipment transmitting a beam that widens as it travels through space, comprising:
    scanning a weather cell with said transmitted beam to obtain information relating to the position of the weather disturbance in space;
    displaying the obtained information in the form of a display showing the position of the weather disturbance relative to reference marks positioned on the display, the position of the reference marks being related to the position of the aircraft and being distorted due to the widening of the transmitted beams;
    displaying numerical designations with said reference marks, said numerical designations indicating the position of said reference marks related to the position of the aircraft;
    developing a distortion factor based upon the beam being positioned straight ahead of the aircraft, whereupon the beam width extremities at a given range of the radar equipment extend substantially normal to the beam centerline;
    using the developed distortion factor as an approximation for other positions of the beam relative to the aircraft for each range of the radar equipment, whereupon the developed distortion factor is a constant for all ranges; and
    changing said numerical designations for effectively adjusting the position of the reference marks on the display to compensate for said distortion.

4. A method as described by claim 3, wherein:
    developing a distortion factor based upon the beam being positioned straight ahead of the aircraft, whereupon the beam width extremities at a given range of the radar equipment extend normal to the beam centerline develops a maximum distortion factor.

5. A method for displaying information relating to a weather disturbance, and which information is obtained from weather radar equipment mounted on an aircraft, said weather radar equipment transmitting a beam that widens as it travels through space, comprising:
    scanning a weather cell with said transmitted beam to obtain information relating to the position of the weather disturbance in space;
    displaying the obtained information in the form of a display showing the position of the weather disturbance relative to reference marks positioned on the display, the position of the reference marks being related to the position of the aircraft and being distorted due to the widening of the transmitted beam;

developing a distortion factor based upon the beam being positioned straight ahead of the aircraft, whereupon the beam width extremities at a given range of the radar equipment extend substantially normal to the beam centerline;

using the developed distortion factor as an approximation for other positions of the beam relative to the aircraft, for each range of the radar equipment, whereupon the developed distortion factor is a constant for all ranges; and adjusting the position of the reference marks on the display by adjusting the scale of the display by the developed distortion factor as the range of the radar equipment is adjusted to compensate for said distortion.

6. A method as described by claim 5 wherein:

developing a distortion factor based upon the beam being positioned straight ahead of the aircraft, whereupon the beam width extremities at a given range of the radar equipment extend normal to the beam centerline develops a maximum distortion factor.

* * * * *